Feb. 24, 1953     C. D. RICE     2,629,341
DIVIDING WHEEL HAVING MOVABLE BLADES FOR PINCHING
OFF PORTIONS OF RELATIVELY ADVANCING
RIBBON OF DOUGH OR THE LIKE
Filed March 1, 1949
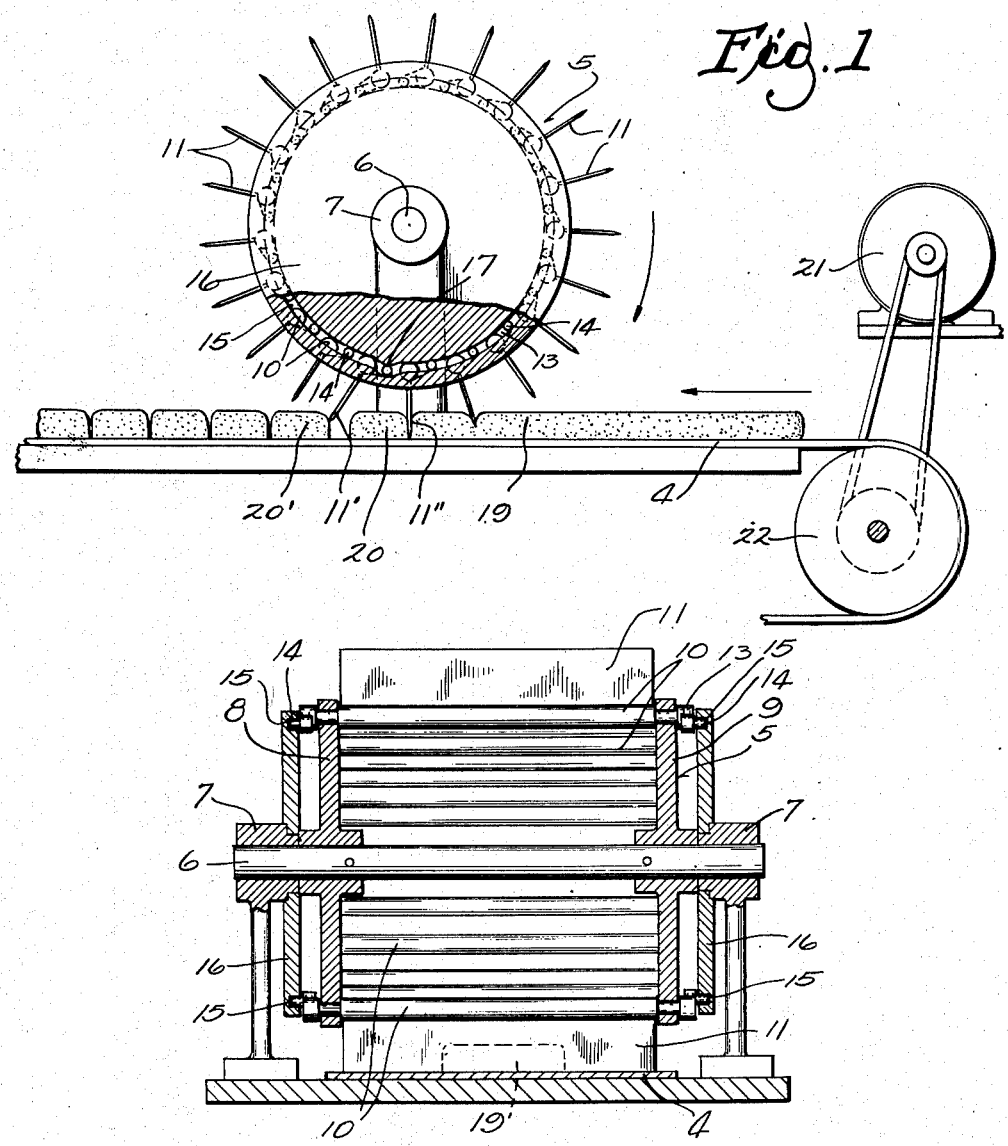
Inventor
CURTIS D. RICE
By
Wheeler, Wheeler & Wheeler
Attorneys Patented Feb. 24, 1953

2,629,341

UNITED STATES PATENT OFFICE 2,629,341

DIVIDING WHEEL HAVING MOVABLE BLADES FOR PINCHING OFF PORTIONS OF RELATIVELY ADVANCING RIBBON OF DOUGH OR THE LIKE

Curtis D. Rice, Kalamazoo, Mich.

Application March 1, 1949, Serial No. 78,946

8 Claims. (Cl. 107—21)

This invention relates to a dividing wheel having movable blades for pinching off portions of a relatively advancing ribbon of dough or the like. The present application is a companion to my applications entitled "Machine for Preparing Dough for the Manufacture of Filled Bakery Goods," Serial No. 78,947, filed March 1, 1949, and "Dough Divider for Bakeries," Serial No. 78,948, filed March 1, 1949, now Patent No. 2,619,051, dated November 5, 1952, respectively.

In order to prevent the accumulation of dough upon the strippers previously provided for the blades of the dividing wheels, the present invention contemplates a construction in which each blade is so movable as to take advantage of the adhesion of the dough to its conveyor and to the successive blade to permit the blade in advance of the separated portion of dough to move free thereof by oscillating with respect to the wheel upon which it is mounted. The manner in which this may be accomplished is disclosed, and other objects will appear more fully, in the following specification having reference to the accompanying drawing, wherein Fig. 1 is a view in side elevation of the divider embodying the invention, portions thereof being broken away to expose a cam track which controls blade positions.

Fig. 2 is a view in transverse section through the device of Fig. 1.

The dough conveyor 4, which may comprise a belt or the like, moves beneath the dividing wheel 5, the wheel preferably rotating idly on shaft 6, carried in bearing supports 7.

As best shown in Fig. 2, the wheel comprises a pair of heads 8 and 9 having peripherally spaced bearings for the rock shafts 10 which carry the respective blades 11. Each rock shaft is provided with a terminal crank at 13 having an offset crank pin 14 operating in a cam slot 15 provided in the adjacent disk 16, the said disk being in fixed connection with the bearings 7.

The cam slot may be, and desirably is, completely concentric with the axis of the supporting shaft 6, except at the point indicated at 17 in Fig. 1, where the cam slot is eccentric, dipping downwardly sufficiently so that the crank pin 14, in following the slot, will oscillate its respective rock shaft 10 sufficiently to cause the attached blade 11 to move forwardly in its general direction of travel at a rate slightly faster than the normal rate of peripheral movement of the other blades. As shown in Fig. 1, this will cause successive blades to assume the angular position indicated at 11', thereby abruptly increasing the angle between the blade at 11' and the ensuing blade at 11".

The blade at 11" has completely penetrated the dough ribbon at 19 to separate a portion 20 therefrom. While the portion 20 remains adherent to the belt 4 and to the blade 11", the abrupt change of angular position of the blade at 11' will free such blade from the separated dough portion 20 and will tend to widen the gap between the dough portion 20 and the next preceding dough portion at 20'.

It is found that where highly polished blades are used, it is possible to free them by change of angle from the dough portions which they have severed, whereby the dividing wheel will rotate indefinitely without dough accumulating on its blades.

While it is broadly immaterial how the dividing wheel is operated, it is perfectly practicable to allow it to rotate idly, being operated by contact of its blades with the work as herein disclosed. It is also broadly immaterial how the relative movement between the ribbon support 4 and the dividing wheel support 6 is achieved, but it is preferred that the ribbon support comprise a conveyor which may be driven by any suitable means in the direction indicated by the arrow in Fig. 1, as by the motor 21 connected to one of the conveyor pulleys 22. In any case, the oscillation of the blade to free it from the last separated portion of dough is in the relative direction in which the separated portions of dough are successively discharged from beneath the dividing wheel. In the device illustrated, this is the direction in which both the blades and the separated portions of dough are advancing.

I claim:

1. In a device of the character described, the combination with a work support having a rectilinear portion, and a wheel support, and means for effecting relative movement therebetween, of a wheel rotatable on the wheel support and provided with peripherally spaced and substantially radially extending blades movable on the wheel in circuitous paths for substantial contact with the work support to sever successive work pieces from work on the support, each of said blades being mounted for movement respecting the wheel upon which it is carried, and positive actuating connections including parts coacting as each succesive blade leaves the work support for giving such blade movement independent of the wheel in the direction in which it is advancing with the wheel at the time, the blade movement being adequate in extent to effect pressure engagement of the blade with the work piece severed thereby to push the rear end of said work piece ahead of the unsevered work in the direction of advance of said blade.

2. The device of claim 1 in which the coacting parts comprise a stationary cam and a bell crank for each blade provided with a cam follower for coacting with the cam for the oscillation of the blade.

3. In a device of the character described, the combination with a conveyor belt having a substantially rectilinearly extending portion, of a shaft disposed transversely above the said portion of the belt, a divider wheel mounted for rotation upon the shaft, at least one stationary cam plate adjacent the wheel, a set of rock shafts carried by the wheel, blades mounted on the respective rock shafts and projecting in generally radial directions from the wheel to an extent such as to substantially contact said belt in the course of wheel rotation for severing loaves from dough advancing with said belt, each blade being oscillatable upon its rock shaft, cam follower means connected with each rock shaft and cooperative with the cam for holding the respective blades in dough penetrating position as the blades approach the conveyor, the said cam comprising an offset portion with which said follower means coacts to effect an advancing oscillation of each blade as it leaves the conveyor, said oscillation being sufficient in direction and extent to advance the rear end of each newly severed loaf on the belt away from contact with the severed end of the successive dough on the belt.

4. The device of claim 3 in which the cam plate has a cam channel eccentric with respect to the shaft to effect oscillation of the respective blades in a forward direction as they leave the conveyor.

5. Apparatus for dividing dough into loaves comprising a conveyor on which a strip of dough may be advanced, a dividing wheel mounted for rotation in the path of the conveyor, said wheel having radially extending blades successively movable into the path of conveyor movement and against the conveyor to pinch loaves from the dough strip, and thereby rotate the wheel simultaneously with the feeding of the dough whereby to successively sever loaves, and means, effective after the loaves have been severed, for positively advancing the wheel blades faster than the dough strip is being fed to produce gaps between the strip and successive severed loaves.

6. In a device for dividing dough, the combination with a work conveyor having a rectilinear portion for advancing a strip of dough to be divided into loaves, in combination with a dividing wheel comprising a rotor provided with pivotally mounted dough dividing blades extending generally radially thereof for successively substantially contacting the conveyor for severing successive loaves from the dough strip on the conveyor, each of said blades being provided with an actuating connection having positive means operative as each blade leaves the conveyor for positively oscillating the blade on its pivot against the resistance of the previously severed loaf and forwardly with respect to the following blade in the direction of rotor rotation, the direction and extent of blade oscillation being sufficient to thrust forwardly upon the conveyor the rear surface of the loaf just severed by such blade, whereby to widen the gap between such loaf and the advancing end of the strip of dough.

7. The device of claim 6 in which the blade actuation connections include bell cranks connected with the respective blades and cam means cooperative with the bell cranks for the oscillation of the cranks and blades in succession.

8. The device of claim 7 in which each of said cranks is provided with a pin, the cam means comprising a continuous slot in which the respective pins are operable during rotor rotation, the said cam slot having an eccentric portion for effecting forward oscillation of the blade.

CURTIS D. RICE.

REFERENCES CITED

The following references are of record in the file of this patent:

UNITED STATES PATENTS

| Number | Name | Date |
| --- | --- | --- |
| 459,719 | Cunningham | Sept. 15, 1891 |
| 870,249 | Patterson | Nov. 5, 1907 |
| 1,202,028 | Carter | Oct. 24, 1916 |
| 1,424,117 | Popper | July 25, 1922 |
| 1,967,154 | Molins | July 17, 1934 |